(12) United States Patent
Nakano et al.

(10) Patent No.: US 12,072,113 B2
(45) Date of Patent: Aug. 27, 2024

(54) FAN DEVICE, AND UTILIZATION UNIT AND HEAT SOURCE UNIT OF AN AIR CONDITIONER, HOT WATER SUPPLIER, AND AIR CLEANER EACH INCLUDING THE FAN DEVICE

(71) Applicant: DAIKIN INDUSTRIES, LTD., Osaka (JP)

(72) Inventors: Akihiro Nakano, Osaka (JP); Yoshinori Takayama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/222,117

(22) Filed: Jul. 14, 2023

(65) Prior Publication Data
US 2023/0358428 A1    Nov. 9, 2023

Related U.S. Application Data

(63) Continuation of application No. PCT/JP2022/002415, filed on Jan. 24, 2022.

(30) Foreign Application Priority Data

Jan. 29, 2021 (JP) .................. 2021-013491

(51) Int. Cl.
*F24F 11/61* (2018.01)
*F24F 1/0022* (2019.01)
*F24F 1/38* (2011.01)

(52) U.S. Cl.
CPC ............ *F24F 11/61* (2018.01); *F24F 1/0022* (2013.01); *F24F 1/38* (2013.01)

(58) Field of Classification Search
CPC .......... F04B 49/10; F04B 49/103; F24F 11/61
See application file for complete search history.

(56) References Cited

U.S. PATENT DOCUMENTS 4,501,534 A * 2/1985 Hargis ................. H02K 5/1672
  417/572
4,711,204 A * 12/1987 Rusconi .................. F02N 19/10
  122/26

(Continued)

FOREIGN PATENT DOCUMENTS

CN      211888470 U    11/2020
EP      0 097 606 A2    1/1984

(Continued)

OTHER PUBLICATIONS

International Preliminary Report of corresponding PCT Application No. PCT/JP2022/002415 dated Aug. 10, 2023.

(Continued)

*Primary Examiner* — Mohammad Ali
*Assistant Examiner* — Vincent W Chang
(74) *Attorney, Agent, or Firm* — Global IP Counselors, LLP

(57) ABSTRACT

A fan device includes a motor and a control unit. The motor has a variable number of revolutions. The motor includes a shaft supported by a bearing enclosing lubricant. The control unit drives the motor. The control unit executes, when continuously driving the motor at a first number of revolutions or less for a first time period, driving the motor at a second number of revolutions more than the first number of revolutions for a second time period shorter than the first time period. The first number of revolutions causes poor oil film formation of the lubricant in the bearing if the motor is driven for more than the first time period. The second number of revolutions causes oil film formation of the lubricant in the bearing if the motor is driven for the second time period.

17 Claims, 7 Drawing Sheets

(56) References Cited

U.S. PATENT DOCUMENTS

| | | | | |
|---|---|---|---|---|
| 5,723,967 | A * | 3/1998 | Hongo | H02P 6/21 |
| | | | | 318/722 |
| 9,303,688 | B2 * | 4/2016 | Grosso | F04D 29/046 |
| 2004/0157667 | A1 * | 8/2004 | Ishijima | F16D 3/2055 |
| | | | | 464/111 |
| 2006/0223391 | A1 * | 10/2006 | Fuse | B63H 23/321 |
| | | | | 440/82 |
| 2008/0196445 | A1 * | 8/2008 | Lifson | F25B 49/025 |
| | | | | 417/44.1 |
| 2010/0231074 | A1 * | 9/2010 | Yamashita | F16C 33/107 |
| | | | | 384/114 |
| 2011/0276237 | A1 * | 11/2011 | Yamaguchi | F16H 61/143 |
| | | | | 701/50 |
| 2021/0039821 | A1 * | 2/2021 | Harvey | B65C 9/1892 |

FOREIGN PATENT DOCUMENTS

| | | |
|---|---|---|
| JP | 59-6779 A | 1/1984 |
| JP | 3-151596 A | 6/1991 |
| JP | 7-322671 A | 12/1995 |
| JP | 2002-155870 A | 5/2002 |
| JP | 2017-67046 A | 4/2017 |

OTHER PUBLICATIONS

International Search Report of corresponding PCT Application No. PCT/JP2022/002415 dated Mar. 1, 2022.
European Search Report of corresponding EP Application No. 22 74 5794.2 dated Jun. 4, 2024.

* cited by examiner

FAN DEVICE, AND UTILIZATION UNIT AND HEAT SOURCE UNIT OF AN AIR CONDITIONER, HOT WATER SUPPLIER, AND AIR CLEANER EACH INCLUDING THE FAN DEVICE

CROSS-REFERENCE TO RELATED APPLICATIONS

This is a continuation of International Application No. PCT/JP2022/002415 filed on Jan. 24, 2022, which claims priority to Japanese Patent Application No. 2021-013491, filed on Jan. 29, 2021. The entire disclosures of these applications are incorporated by reference herein.

BACKGROUND

Technical Field

The present disclosure relates to a fan device, and a utilization unit and a heat source unit of an air conditioner, a hot water supplier, and an air cleaner each including the fan device.

Background Art

There has been known a fan device configured to rotate a fan with use of a motor. Japanese Laid-Open Patent Publication No. 2017-067046 discloses a fan device (fan) including a shaft (motor shaft), a bearing supporting the motor shaft, a tubular sleeve disposed between the bearing and an end of the motor shaft and penetrated by the motor shaft, a tubular fan boss disposed between the sleeve and an end of the motor shaft and penetrated by the motor shaft, and a fastening member disposed at an end of the motor shaft, in which the sleeve and the fan boss are interposed between the bearing and the fastening member.

SUMMARY

A fan device includes a motor and a control unit. The motor has a shaft supported by a bearing enclosing lubricant, and has a variable number of revolutions. The control unit drives the motor. The control unit executes, when continuously driving the motor at a first number of revolutions or less for a first time period, driving the motor at a second number of revolutions more than the first number of revolutions for a second time period shorter than the first time period. The first number of revolutions causes poor oil film formation of the lubricant in the bearing if the motor is driven for more than the first time period. The second number of revolutions causes oil film formation of the lubricant in the bearing if the motor is driven for the second time period.

DETAILED DESCRIPTION OF EMBODIMENT(S)

First Embodiment (1) Entire Configuration

A fan device according to the present disclosure is exemplarily applied to a utilization unit of an air conditioner configured to achieve a vapor compression refrigeration cycle, though not limited in terms of its use. Described below with reference to the drawings is an air conditioner 1 including a fan device 100 exemplifying the fan device according to the present disclosure.

Description is hereinafter made initially to the air conditioner 1. Thereafter described are details of the fan device.

(2) Detailed Configurations (2-1) Configuration of Air Conditioner

Figure 1:
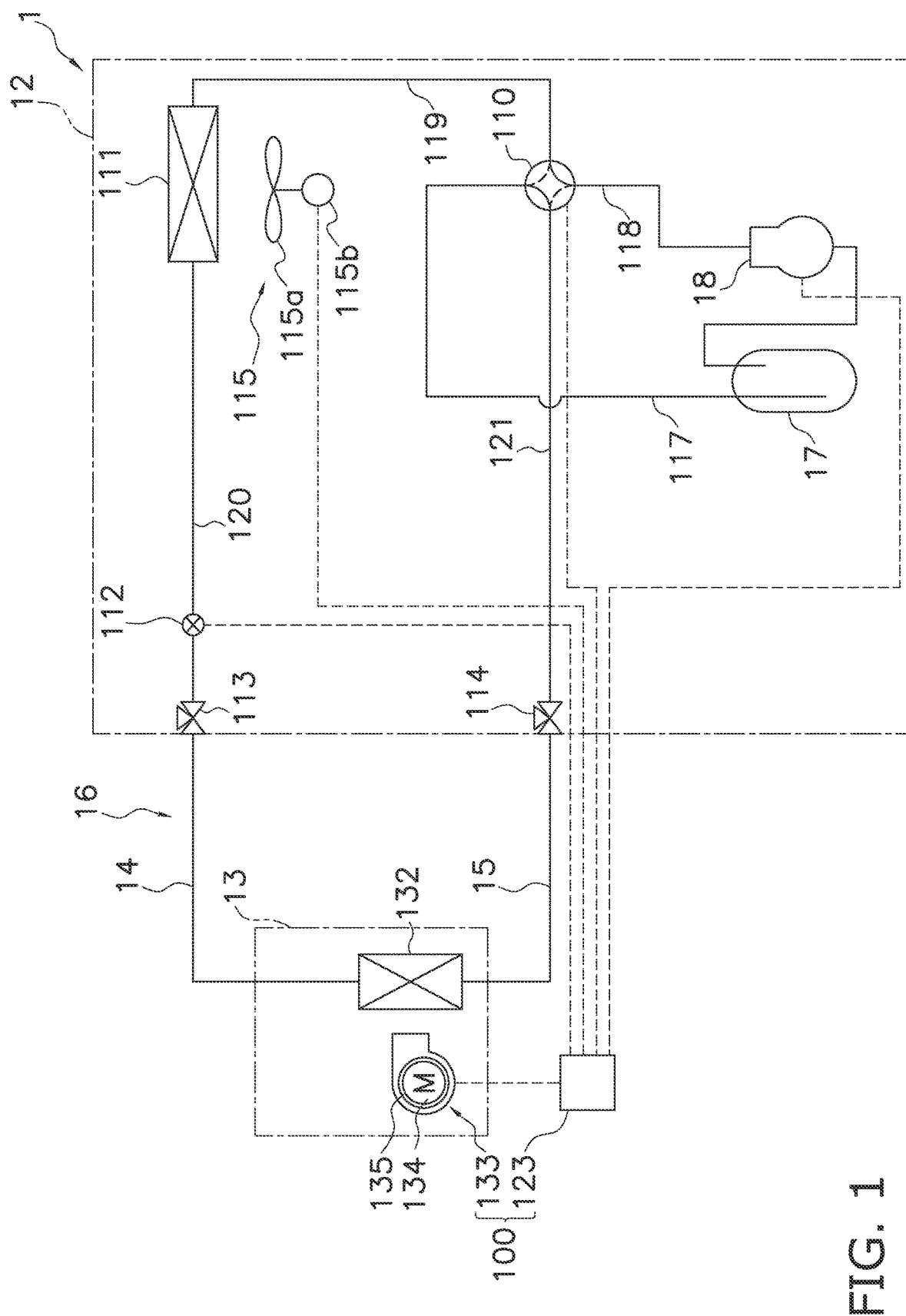
FIG. 1 is a schematic configuration diagram of an air conditioner 1 including a fan device according to an embodiment of the present disclosure.

The air conditioner 1 will be described with reference to the drawings. FIG. 1 is a schematic configuration diagram of the air conditioner 1 including a fan device according to an embodiment of the present disclosure.

The air conditioner 1 is configured to achieve the vapor compression refrigeration cycle to cool and heat an air conditioning target space. Examples of the air conditioning target space include a space in a building such as an office building, a commercial facility, or a residence.

As depicted in FIG. 1, the air conditioner 1 principally includes a heat source unit 12, a utilization unit 13, a liquid-refrigerant connection pipe 14, a gas-refrigerant connection pipe 15, and a control unit 123 configured to control devices constituting the heat source unit 12 and the utilization unit 13. The liquid-refrigerant connection pipe 14 and the gas-refrigerant connection pipe 15 are refrigerant connection pipes connecting the heat source unit 12 and the utilization unit 13. In the air conditioner 1, the heat source unit 12 and the utilization unit 13 are connected via the refrigerant connection pipes 14 and 15 to constitute a refrigerant circuit 16.

The air conditioner 1 depicted in FIG. 1 includes the single utilization unit 13. The air conditioner 1 may alternatively include a plurality of utilization units 13 connected parallelly to the heat source unit 12 by the refrigerant connection pipes 14 and 15. The air conditioner 1 may still alternatively include a plurality of heat source units 12. Furthermore, the air conditioner 1 may be of an integral type including the heat source unit 12 and the utilization unit 13 that are formed integrally with each other.

As depicted in FIG. 1, the heat source unit 12 principally includes an accumulator 17, a compressor 18, a flow direction switching mechanism 110, a heat source heat exchanger 111, an expansion mechanism 112, a liquid-side shutoff valve 113, a gas-side shutoff valve 114, and a heat source fan 115. As depicted in FIG. 1, the utilization unit 13 principally includes a utilization heat exchanger 132 and a utilization fan 133.

As to be described in detail later, the fan device 100 according to the present disclosure includes the control unit 123 and the utilization fan 133.

The air conditioner 1 will be described in terms of its behavior.

During cooling operation, the control unit 123 controls behavior of the flow direction switching mechanism 110 to switch the refrigerant circuit 16 into a state where the heat source heat exchanger 111 functions as a refrigerant radiator (condenser) and the utilization heat exchanger 132 functions as a refrigerant evaporator. Specifically, the control unit 123 controls behavior of the flow direction switching mechanism 110 to cause a suction tube 117 connected to a suction side of the compressor 18 to communicate with a second gas refrigerant tube 121 connecting the flow direction switching mechanism 110 and the gas-side shutoff valve 114. Furthermore, the control unit 123 controls behavior of the flow direction switching mechanism 110 to cause a discharge tube 118 connected to a discharge side of the compressor 18 to communicate with a first gas refrigerant tube 119 connecting the flow direction switching mechanism 110 and a gas side of the heat source heat exchanger 111 (see solid lines in the flow direction switching mechanism 110 in FIG. 1). During cooling operation, the control unit 123 operates the compressor 18, the heat source fan 115, and the utilization fan 133. During cooling operation, the control unit 123 adjusts, in accordance with measurement values and the like of various sensors, the compressor 18, the number of revolutions of each of a fan motor 115a of the heat source fan 115 and a fan motor 134 of the utilization fan 133, and an opening degree of an electronic expansion valve exemplifying the expansion mechanism 112 to a predetermined opening degree.

When the control unit 123 controls behavior of various devices in the air conditioner 1, a low-pressure gas refrigerant in the refrigeration cycle is sucked into the compressor 18, is compressed to have high pressure in the refrigeration cycle, and is then discharged from the compressor 18. A high-pressure gas refrigerant discharged from the compressor 18 is sent to the heat source heat exchanger 111 via the flow direction switching mechanism 110. The high-pressure gas refrigerant sent to the heat source heat exchanger 111 exchanges heat with air serving as a cooling source supplied by the heat source fan 115 in the heat source heat exchanger 111 functioning as a refrigerant radiator to radiate heat, and comes into a high-pressure liquid refrigerant. The high-pressure liquid refrigerant obtained by radiating heat in the heat source heat exchanger 111 is sent to the expansion mechanism 112 via a liquid refrigerant tube 120. In the expansion mechanism 112, the high-pressure liquid refrigerant is decompressed to come into a low-pressure refrigerant in a gas-liquid two-phase state. The low-pressure refrigerant in the gas-liquid two-phase state obtained by decompression in the expansion mechanism 112 is sent to the utilization heat exchanger 132 via the liquid refrigerant tube 120, the liquid-side shutoff valve 113 and the liquid-refrigerant connection pipe 14. The low-pressure refrigerant in the gas-liquid two-phase state sent to the utilization heat exchanger 132 exchanges heat to be evaporated, with air supplied into the air conditioning target space by the utilization fan 133 in the utilization heat exchanger 132 functioning as a refrigerant evaporator. In this case, air cooled through heat exchange with the refrigerant is supplied into the air conditioning target space to cool the air conditioning target space. The low-pressure gas refrigerant evaporated in the utilization heat exchanger 132 is sucked into the compressor 18 again via the gas-refrigerant connection pipe 15, the gas-side shutoff valve 114, the flow direction switching mechanism 110, and the accumulator 17.

During heating operation, the control unit 123 controls behavior of the flow direction switching mechanism 110 to switch the refrigerant circuit 16 into a state where the heat source heat exchanger 111 functions as a refrigerant evaporator and the utilization heat exchanger 132 functions as a refrigerant radiator (condenser). Specifically, the control unit 123 controls behavior of the flow direction switching mechanism 110 to cause the suction tube 117 to communicate with the first gas refrigerant tube 119 and cause the discharge tube 118 to communicate with the second gas refrigerant tube 121 (see broken lines in the flow direction switching mechanism 110 in FIG. 1). During heating operation, the control unit 123 operates the compressor 18, the heat source fan 115, and the utilization fan 133. During heating operation, the control unit 123 adjusts, in accordance with measurement values and the like of various sensors, the compressor 18, the number of revolutions of each of the fan motor 115a of the heat source fan 115 and the fan motor 134 of the utilization fan 133, and an opening degree of an electronic expansion valve exemplifying the expansion mechanism 112 to a predetermined opening degree.

When the control unit 123 controls behavior of various devices in the air conditioner 1 in this manner, the low-pressure gas refrigerant in the refrigeration cycle is sucked into the compressor 18, is compressed to have high pressure in the refrigeration cycle, and is then discharged from the compressor 18. The high-pressure gas refrigerant discharged from the compressor 18 is sent to the utilization heat exchanger 132 via the flow direction switching mechanism 110, the gas-side shutoff valve 114, and the gas-refrigerant connection pipe 15. The high-pressure gas refrigerant sent to the utilization heat exchanger 132 exchanges heat with air supplied into the air conditioning target space by the utilization fan 133 in the utilization heat exchanger 132 functioning as a refrigerant radiator (condenser) to radiate heat and come into a high-pressure liquid refrigerant. In this case, air heated through heat exchange with the refrigerant is supplied into the air conditioning target space to heat the air conditioning target space. The high-pressure liquid refrigerant obtained by radiating heat in the utilization heat exchanger 132 is sent to the expansion mechanism 112 via the liquid-refrigerant connection pipe 14, the liquid-side shutoff valve 113, and the liquid refrigerant tube 120. The refrigerant sent to the expansion mechanism 112 is decompressed by the expansion mechanism 112 to come into a low-pressure refrigerant in the gas-liquid two-phase state. The low-pressure refrigerant in the gas-liquid two-phase state obtained by decompression in the expansion mechanism 112 is sent to the heat source heat exchanger 111 via the liquid refrigerant tube 120. The low-pressure refrigerant in the gas-liquid two-phase state sent to the heat source heat exchanger 111 exchanges heat with air serving as a heating source supplied by the heat source fan 115 in the heat source heat exchanger 111 functioning as a refrigerant evaporator to be evaporated and come into a low-pressure gas refrigerant. The low-pressure refrigerant obtained by evaporation in the heat source heat exchanger 111 is sucked into the compressor 18 again via the flow direction switching mechanism 110 and the accumulator 17.

(2-2) Configuration of Fan Device

Figure 2:
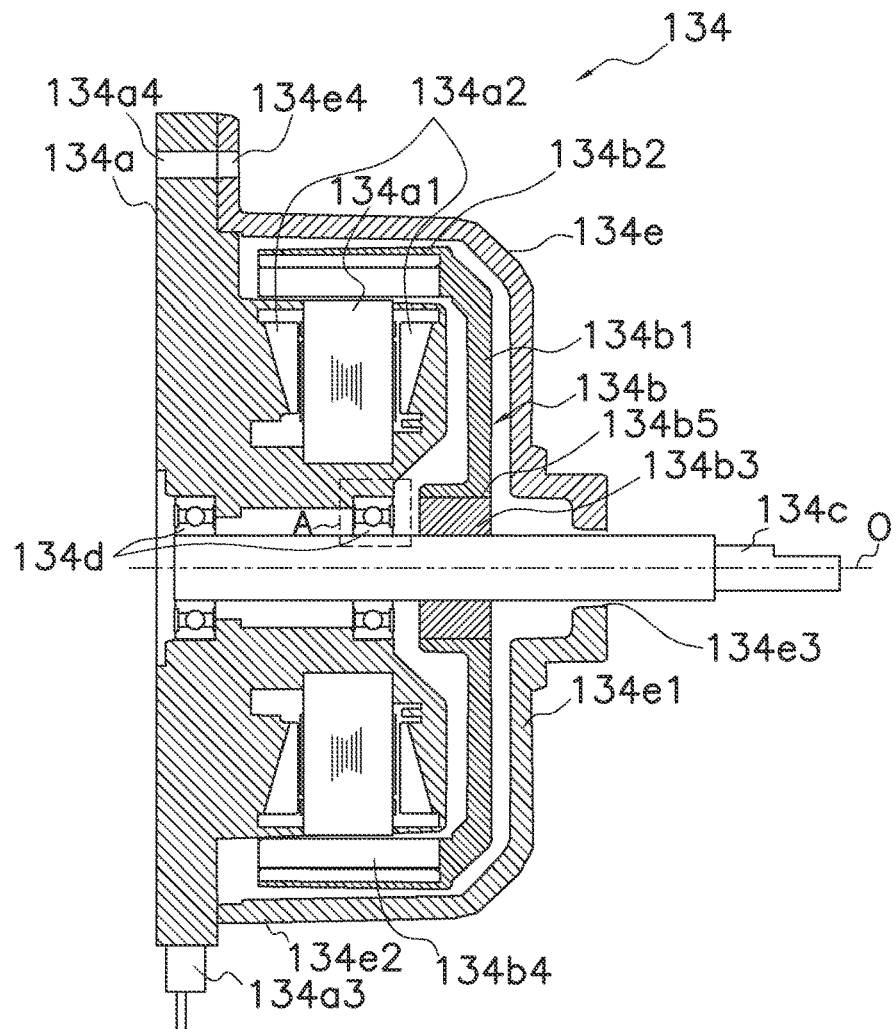
FIG. 2 is a sectional view of a fan motor 134.

The fan device 100 includes the control unit 123 and the utilization fan 133. The utilization fan 133 principally includes the fan motor 134 and a fan rotor 135. FIG. 2 is a sectional view of the fan motor 134.

(2-2-2) Fan Motor and Fan Rotor

The fan motor 134 rotation-drives the fan rotor 135. The fan motor 134 is of an outer rotor type. The fan motor 134 is an inverter motor including an inverter (not depicted) and having a variable number of revolutions. The number of revolutions of the fan motor 134 is controlled in accordance with a control signal outputted from the control unit 123. The fan motor 134 principally includes a stator 134a, a rotor 134b, a shaft 134c, two bearings 134d, and a casing 134e. The fan motor 134 exemplifies a motor.

The stator 134a is a substantially tubular member, and principally includes a stator core 134a1 made of a magnetic material and having a cylindrical shape, and a stator coil 134a2 wound around the stator core 134a1. The stator core 134a1 is disposed to have a center axis substantially matching a center axis of the stator 134a. The center axis of the stator 134a and the center axis of the stator core 134a1 match a shaft of the fan rotor 135. Each of the center axes will be hereinafter called a shaft center O.

The stator 134a has an outer circumference provided with a bolt hole 134a4 used to fix the casing 134e to the stator 134a with bolts. The stator 134a is fixed to a casing (not depicted) of the utilization unit 13. The stator 134a includes a connector 134a3 used to supply the stator coil 134a2 with electric power. The inverter included in the fan motor 134 is connected to the control unit 123 via a data line connected to the connector 134a3. The fan motor 134 receives a control signal from the control unit 123 via the connector 134a3 and the data line.

The rotor 134b is a cup-shaped member disposed to have a predetermined gap from the outer circumference of the stator 134a. The rotor 134b principally includes a flat part 134b1, an outer sleeve 134b2, and a coupling portion 134b3.

The flat part 134b1 is principally formed into a substantially circular disc shape. The flat part 134b1 has a center provided with a circular opening 134b5 used to dispose the coupling portion 134b3. The opening 134b5 is positioned to have a center perpendicular to the shaft center O.

The outer sleeve 134b2 is formed into a substantially tubular shape extending from an outer circumferential portion of the flat part 134b1 toward the stator 134a along the shaft center O. The outer sleeve 134b2 includes a magnetic pole member 134b4 supplying the stator 134a with field magnetic flux. The magnetic pole member 134b4 faces an outer circumferential surface of the stator coil 134a2 via an air gap.

The coupling portion 134b3 is a cylindrical member attached to the opening 134b5 of the flat part 134b1. The coupling portion 134b3 has an outer circumferential surface fixed to an inner circumferential surface of the opening 134b5 of the flat part 134b1. The coupling portion 134b3 has an inner circumference to which the shaft 134c having a columnar shape is fixed to have a center axis matching the shaft center O.

Figure 3:
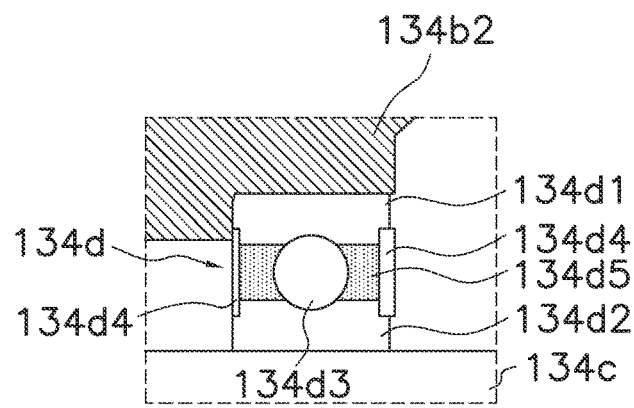
FIG. 3 is an enlarged view of a bearing 134d and the periphery thereof surrounded with a frame A.

Each of the bearings 134d rotatably retains the shaft 134c to the stator 134a. FIG. 3 is an enlarged view of the bearing 134d and the periphery thereof surrounded with a frame A. The bearing 134d is a ball bearing including an outer ring 134d1, an inner ring 134d2, and a ball 134d3. The outer ring 134d1 has an outer circumferential surface fitted to be fixed to an inner circumferential surface of the stator 134a, and the inner ring 134d2 has an inner circumferential surface fitted to be fixed to an outer circumferential surface of the shaft 134c. The bearing 134d is of a hermetically sealed type filled therein with lubricant 134d5 such as grease. Specifically, there is attached a sealing member 134d4 to hermetically seal a space accommodating the ball 134d3 at each end, in an extending direction of the shaft center O, of each of the outer ring 134d1 and the inner ring 134d2. The space is filled with the lubricant 134d5 such as grease. Examples of the lubricant 134d5 include urea grease and lithium soap grease, though not limited thereto.

The two bearings 134d support the shaft 134c in the fan motor 134. The two bearings 134d are aligned on an inner circumference of the stator 134a to have a predetermined gap in the extending direction of the shaft center O.

The casing 134e is a cup-shaped member accommodating the stator 134a as well as the rotor 134b. The casing 134e includes a flat part 134e1 and an outer sleeve 134e2.

The flat part 134e1 is principally formed into a substantially circular disc shape facing the flat part 134b1 of the rotor 134b. The flat part 134e1 has a center provided with an opening 134e3 allowing the shaft 134c to penetrate. The flat part 134e1 faces the flat part 134b1 of the rotor 134b with a predetermined gap therebetween.

The outer sleeve 134e2 is formed into a substantially tubular shape extending from an outer circumferential portion of the flat part 134e1 toward the stator 134a along the shaft center O The outer sleeve 134e2 faces the outer sleeve 134b2 of the rotor 134b with a predetermined gap therebetween. The casing 134e has a bolt hole 134e4 provided at an end, adjacent to the stator 134a, of the outer sleeve 134b2. The casing 134e is fixed to the stator when a bolt is fastened to the bolt hole 134a4 of the stator 134a via the bolt hole 134e4.

Though not depicted, the fan rotor 135 is fixed to an end, far from the stator 134a, of the shaft 134c.

(2-2-3) Control Unit

Upon control of the heat source unit 12 and the utilization unit 13 during cooling operation and heating operation described above, the control unit 123 executes at least one of first control and second control for inhibition of poor oil film formation in the bearings 134d of the fan motor. The first control and the second control will be described in detail later.

The control unit 123 is embodied by a computer. The control unit 123 includes a control arithmetic device and a storage device. Examples of the control arithmetic device can include a processor such as a CPU or a GPU. The control arithmetic device reads a program stored in the storage device and executes predetermined image processing or arithmetic processing in accordance with the program. The control arithmetic device is further configured to write an arithmetic result to the storage device, and read information stored in the storage device, in accordance with the program.

(3) Control of Fan Motor

Described next is the first control and the second control executed by the control unit 123.

(3-1) First Control

Figure 4:
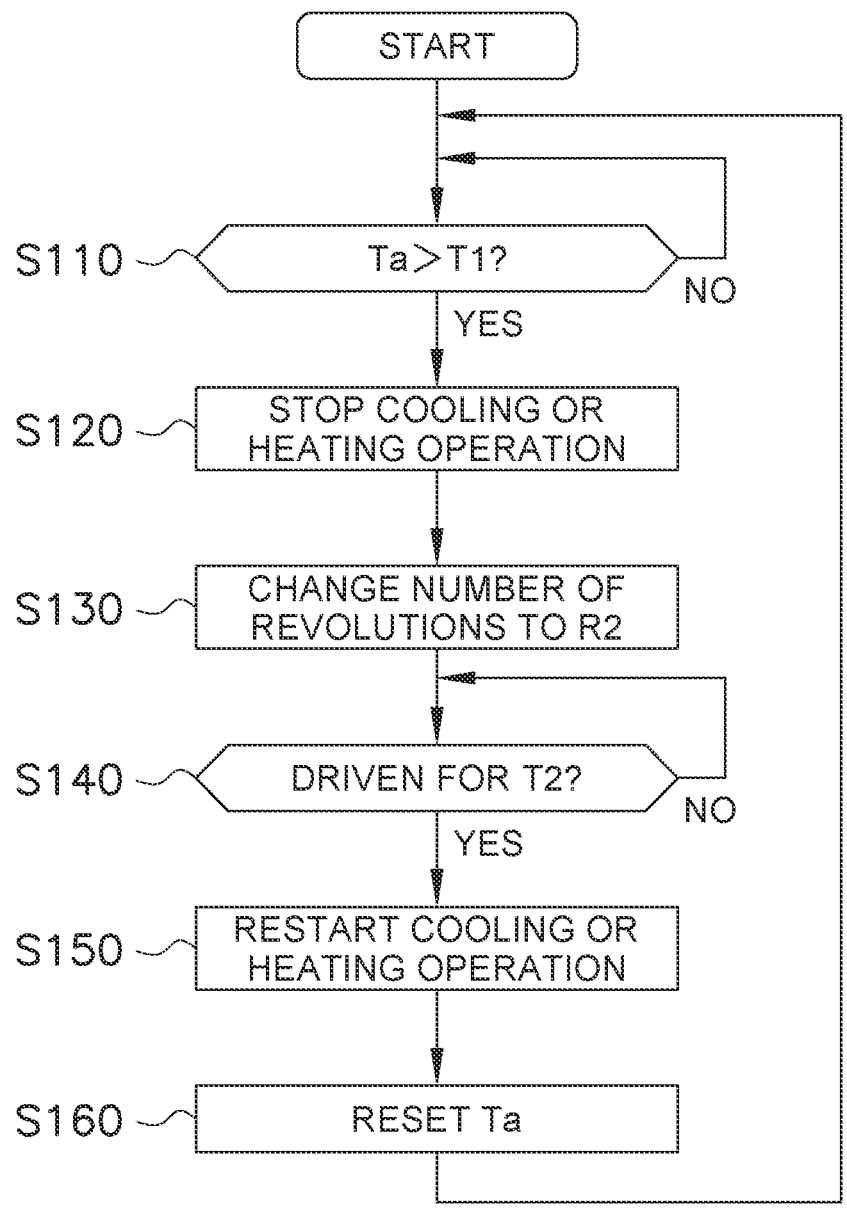
FIG. 4 is a flowchart depicting a control flow of first control.

During the first control, if the control unit 123 continuously drives the fan motor 134 at a predetermined first number of revolutions R1 or less for a first time period T1, the control unit 123 drives the fan motor 134 at a second number of revolutions R2 more than the first number of revolutions R1 for a second time period T2 and then drives the fan motor 134 at the first number of revolutions R1 or less. FIG. 4 is a flowchart depicting a control flow of the first control. The control flow depicted in FIG. 4 starts when the air conditioner 1 is powered on.

In step S110, the control unit 123 detects a number of revolutions of the fan motor 134 during cooling operation or heating operation, calculates an accumulated time period Ta of time periods at a number of revolutions equal to or less than the predetermined first number of revolutions R1, and determines whether or not the accumulated time period Ta exceeds the predetermined first time period T1. The control unit 123 advances to step S120 if the accumulated time period Ta exceeds the predetermined first time period T1 (Yes), or repeats processing in step S110 until the accumulated time period Ta exceeds the predetermined first time period T1 (No). In other words, the control unit 123 controls the number of revolutions of the fan motor 134 in accordance with measurement values and the like of various sensors as in normal cooling operation and heating operation until the accumulated time period Ta exceeds the predetermined first time period T1.

The first number of revolutions R1 suppresses electric power consumption of the fan motor 134 while highly possibly causing poor oil film formation in the bearings 134*d* of the fan motor 134 if the fan motor 134 is continuously driven for more than the first time period T1. The first number of revolutions R1 is exemplarily 50 rpm or more and less than 300 rpm. The first time period T1 is 10 minutes or more and 5 hours or less.

In step S120, the control unit 123 temporarily stops normal cooling operation or heating operation (cooling or heating operation), and advances to step S130.

In step S130, the control unit 123 changes the number of revolutions of the fan motor 134 to the predetermined second number of revolutions R2 more than the first number of revolutions R1, and advances to step S140.

In step S140, the control unit 123 determines whether or not the fan motor 134 is driven at the second number of revolutions R2 for the predetermined second time period T2. The control unit 123 advances to step S150 if the control unit 123 determines that the fan motor 134 is driven at the second number of revolutions R2 for the second time period T2 (Yes). The control unit 123 repeats processing in step S140 if the control unit 123 determines that the fan motor 134 is not driven at the second number of revolutions R2 for the second time period T2 (No).

The second number of revolutions R2 enables oil film formation in the bearings 134*d* of the fan motor 134 during the second time period T2, and is more than the first number of revolutions R1. The second time period T2 does not cause influence on air conditioning capacity of the air conditioner 1 when the fan motor 134 rotates at the second number of revolutions R2. The second number of revolutions R2 is exemplarily 300 rpm or more. The second time period T2 is exemplarily one second or more and two minutes or less.

In step S150, the control unit 123 restarts cooling operation or heating operation stopped in step S120, starts controlling the number of revolutions of the fan motor 134 in accordance with measurement values and the like of various sensors, and advances to step S160. During cooling operation or heating operation, the control unit 123 drives the fan motor 134 at the first number of revolutions R1 or less.

In step S160, the control unit 123 resets the accumulated time period Ta to zero, and advances to step S110.

(3-2) Second Control

Figure 5:
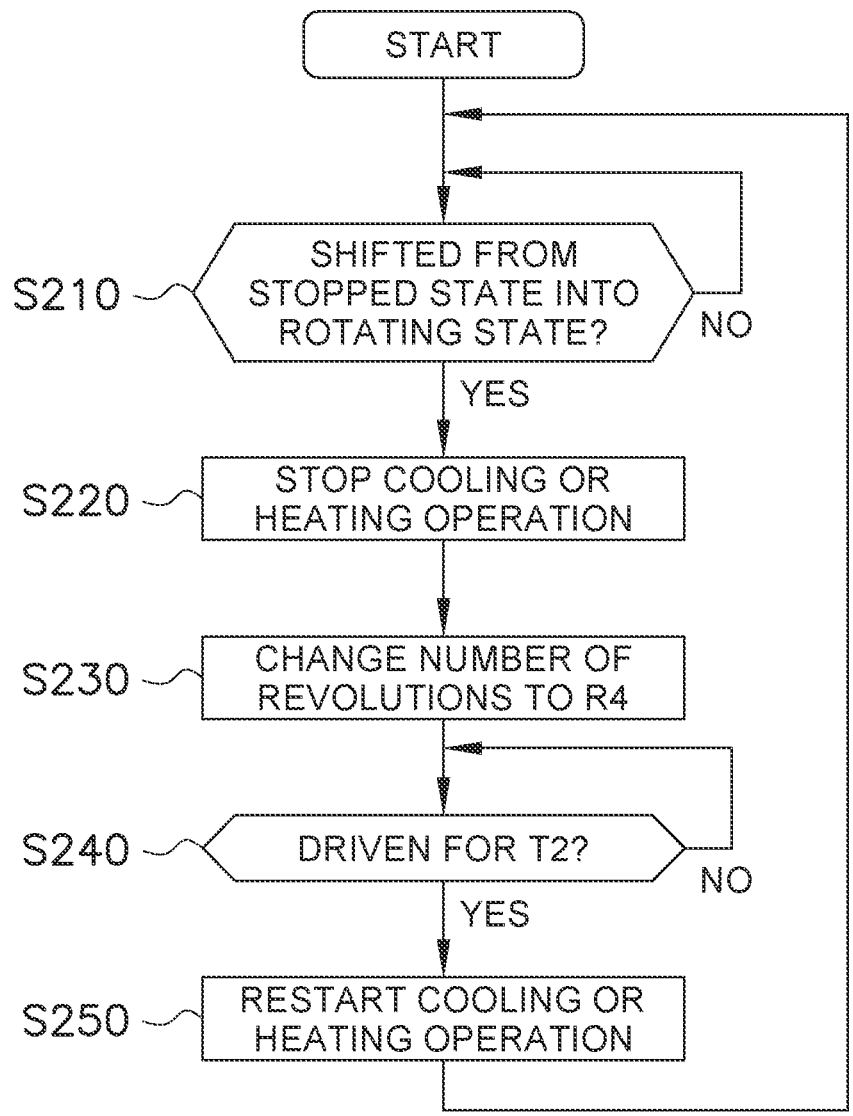
FIG. 5 is a flowchart depicting a control flow of second control.

During the second control, if the control unit 123 shifts a drive state of the fan motor 134 from a stopped state into a rotating state, the control unit 123 drives the fan motor 134 at a predetermined fourth number of revolutions R4 more than a predetermined third number of revolutions R3 for the second time period T2 and then drives the fan motor 134 at the third number of revolutions R3 or less. FIG. 5 is a flowchart depicting a control flow of the second control. The control flow depicted in FIG. 5 starts when the air conditioner 1 is powered on.

In step S210, the control unit 123 determines whether or not the fan motor 134 shifts from the stopped state into the rotating state. The control unit 123 advances to step S220 if the control unit 123 determines that the fan motor 134 shifts from the stopped state into the rotating state (Yes). The control unit 123 repeats processing in step S210 if the control unit 123 determines that the fan motor 134 does not shift from the stopped state into the rotating state (No).

Examples of the case where the fan motor 134 shifts from the stopped state into the rotating state include a case where the air conditioner 1 returns from thermo-off operation. Thermo-off operation is a control in which the control unit 123 tops air conditioning operation of the air conditioner 1 when temperature in the air conditioning target space is out of a predetermined allowable temperature range including set temperature of the air conditioner 1. During thermo-off operation, the control unit 123 brings the compressor 18 and the fan motor 134 into the stopped state. When thermo-off operation is executed and temperature in the air conditioning target space returns into the allowable temperature range, the control unit 123 shifts the fan motor 134 from the stopped state into the rotating state.

In step S220, the control unit 123 temporarily stops normal cooling operation or heating operation, and advances to step S230.

In step S230, the control unit 123 changes the number of revolutions of the fan motor 134 to the predetermined fourth number of revolutions R4 more than the predetermined third number of revolutions R3, and advances to step S240.

In step S240, the control unit 123 determines whether or not the fan motor 134 is driven at the fourth number of revolutions R4 for the predetermined second time period T2. The control unit 123 advances to step S250 if the control unit 123 determines that the fan motor 134 is driven at the fourth number of revolutions R4 for the second time period T2 (Yes). The control unit 123 repeats processing in step S240 if the control unit 123 determines that the fan motor 134 is not driven at the fourth number of revolutions R4 for the second time period T2 (No).

The third number of revolutions R3 suppresses electric power consumption of the fan motor 134 while highly possibly causing poor oil film formation in the bearings 134*d* of the fan motor 134 if the fan motor 134 is continuously driven for more than the first time period T1. The third number of revolutions R3 is exemplarily 50 rpm or more and less than 300 rpm. The third number of revolutions R3 may be equal to or may be different from the first number of revolutions R1.

The fourth number of revolutions R4 enables oil film formation in the bearings 134*d* of the fan motor 134 during the second time period T2, and is more than the third number of revolutions R3. The fourth number of revolutions is exemplarily 300 rpm or more.

In step S250, the control unit 123 restarts cooling operation or heating operation stopped in step S220, starts controlling the number of revolutions of the fan motor 134 in accordance with measurement values and the like of various sensors, and advances to step S210. During cooling operation or heating operation, the control unit 123 drives the fan motor 134 at the third number of revolutions R3 or less.

(4) Characteristics (4-1)

The fan device 100 includes the fan motor 134 and the control unit 123. The fan motor 134 includes the shaft 134*c* supported by the bearings 134*d* enclosing the lubricant 134*d*5, and has a variable number of revolutions. The control unit 123 drives the fan motor 134. The control unit 123 executes at least one of the first control and the second control. During the first control, if the control unit 123 continuously drives the fan motor 134 at the first number of revolutions R1 or less for the first time period T1, the control unit 123 drives the fan motor 134 at the second number of revolutions R2 more than the first number of revolutions R1 and then drives the fan motor 134 at the first number of revolutions R1 or less. During the second control, if the control unit 123 shifts the drive state of the fan motor 134 from the stopped state into the rotating state, the control unit 123 drives the fan motor 134 at the fourth number of revolutions R4 and then drives the fan motor 134 at the third number of revolutions R3 or less, the third number of revolutions R3 being less than the fourth number of revolutions R4.

For reduction in electric power consumption of the fan device 100, the fan motor 134 is desirably driven at a small number of revolutions or stopped. However, when the shaft 134c is rotated at a small number of revolutions for a long period of time or is stopped continuously in the fan motor 134 including the bearings 134d lubricated by the lubricant 134d5, the bearings 134d may have poor oil film formation, in which case preferred oil film formation is not achieved in the bearings 134d.

In the fan device 100, the control unit 123 executes at least one of the first control and the second control, to suppress electric power consumption of the fan motor 134 as well as to inhibit poor oil film formation.

Specifically, due to the first control executed by the control unit 123, if the accumulated time period Ta at which the number of revolution is the predetermined first number of revolutions R1 or less suppressing electric power consumption of the fan motor exceeds the first time period T1, the fan motor 134 is driven at the second number of revolutions R2 for oil film formation. This achieves both suppression of electric power consumption by driving the fan motor 134 at the first number of revolutions R1 and oil film formation in the bearings 134d by driving the fan motor 134 at the second number of revolutions R2.

Due to the second control executed by the control unit 123, if the fan motor 134 shifts from the stopped state into the rotating state, the fan motor 134 is driven at the fourth number of revolutions R4 for oil film formation. This achieves both suppression of electric power consumption by stopping the fan motor 134 and oil film formation in the bearings 134d by driving the fan motor 134 at the fourth number of revolutions R4.

The fan device 100 can accordingly suppress electric power consumption of the fan motor 134 as well as inhibit poor oil film formation in the bearings 134d enclosing the lubricant 134d5.

(4-2)

The utilization unit 13 in the air conditioner 1 includes the fan device 100. The utilization unit 13 can thus suppress electric power consumption of the fan motor 134 as well as inhibit poor oil film formation in the bearings 134d enclosing the lubricant 134d5.

(4-3)

Examples of the case where the drive state of the fan motor 134 shifts from the stopped state into the rotating state include the case where the air conditioner 1 returns from thermo-off operation.

The utilization unit 13 in the air conditioner 1 can thus inhibit poor oil film formation in the bearings 134d of the fan motor 134 during thermo-off operation.

(5) Modifications (5-1) Modification A

The above description exemplifies the case where the fan device according to the present disclosure is applied to the utilization unit 13 in the air conditioner 1. The fan device according to the present disclosure may alternatively be applied to the heat source unit 12 in the air conditioner 1. Specifically, the fan device according to the present disclosure may be include the control unit 123 and the heat source fan 115 included in the heat source unit 12 in the air conditioner 1.

The heat source fan 115 principally includes the fan motor 115a and a fan rotor 115b. Similarly to the fan motor 134, the fan motor 115a includes a bearing supporting a shaft. Similarly to the bearings 134d, the bearing of the fan motor 115a is of a hermetically sealed type filled therein with lubricant such as grease.

The control unit 123 executes at least one of the first control and the second control also for the fan motor 115a of the heat source fan 115.

The heat source unit 12 in the air conditioner 1 can accordingly suppress electric power consumption of the fan motor 115a as well as inhibit poor oil film formation in the fan motor 115a.

Second Embodiment (1) Entire Configuration

Figure 6:
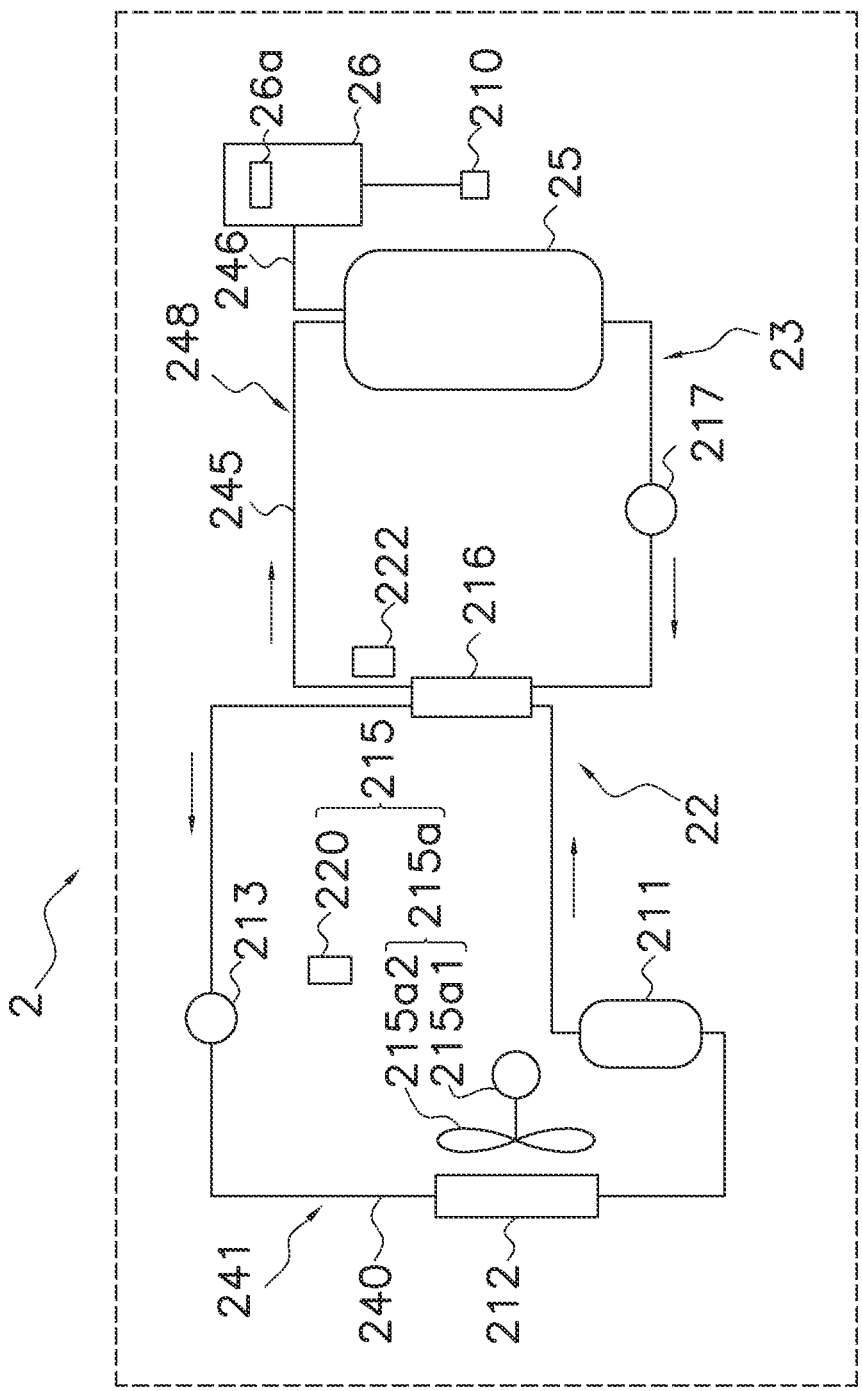
FIG. 6 is a schematic configuration diagram of a hot water supplier 2.

The fan device according to the present disclosure may be applied to a hot water supplier. Described below with reference to the drawings is a hot water supplier 2 including a fan device 215 exemplifying the fan device according to the present disclosure. FIG. 6 is a schematic configuration diagram of the hot water supplier 2. The hot water supplier 2 includes a heat pump unit 22 and a water unit 23.

(2) Detailed Configurations (2-1) Heat Pump Unit

The heat pump unit 22 includes a compressor 211, an outdoor heat exchanger 212, an expansion valve 213, a hot water supply heat exchanger 216, the fan device 215, a refrigerant pipe 240, and a control unit 220. The control unit 220 is provided for both the heat pump unit 22 and the water unit 23.

The compressor 211, the outdoor heat exchanger 212, the expansion valve 213, the fan device 215, and the hot water supply heat exchanger 216 constitute a refrigerant circuit 241 allowing circulation of a refrigerant in the refrigerant pipe 240. The compressor 211 has a discharge side connected with a refrigerant inflow port of the hot water supply heat exchanger 216. The compressor 211 has a suction side connected with a first end of the outdoor heat exchanger 212. The outdoor heat exchanger 212 has a second end connected with a first end of the expansion valve 213. The expansion valve 213 has a second end connected with a refrigerant outflow port of the hot water supply heat exchanger 216. The fan device 215 is disposed to face the outdoor heat exchanger 212. When the fan device 215 rotates, the outdoor heat exchanger 212 is supplied with air to promote heat exchange between the air and the refrigerant in the outdoor heat exchanger 212.

(2-1-1) Outline of Fan Device

The fan device 215 includes the control unit 220 and a fan 215a. The fan 215a principally includes a fan motor 215a1 and a fan rotor 215a2. Similarly to the fan motor 134, the fan motor 215a1 includes a bearing (not depicted) supporting a shaft. Similarly to the bearings 134d, the bearing of the fan motor 215a1 is of a hermetically sealed type filled therein with lubricant such as grease.

(2-2) Water Unit

The water unit 23 includes a pump 217, a hot water supply tank 25, a gas hot water supplier 26, a hot water supply terminal 210, water pipes 245 and 246, and an outputted hot water temperature sensor 222. The pump 217 and the hot water supply heat exchanger 216 constitute a warm water circuit 248 allowing circulation of warm water in the water pipe 245. The pump 217 has a discharge side connected with a warm water inflow port of the hot water supply heat exchanger 216. The pump 217 has a suction side connected with a first end of the hot water supply tank 25. The hot water supply heat exchanger 216 has a warm water outflow port connected to a second end of the hot water supply tank 25.

(3) Behavior of Hot Water Supplier

The control unit 220 of the hot water supplier 2 executes heat application operation. As indicated by arrows in FIG. 6, heat application operation forms a heat application cycle (positive cycle) in which the refrigerant discharged from the compressor 211 flows to the hot water supply heat exchanger 216, the expansion valve 213, and the outdoor heat exchanger 212 in the mentioned order, and the refrigerant having passed the outdoor heat exchanger 212 returns to the compressor 211. In this case, the hot water supply heat exchanger 216 functions as a condenser and the outdoor heat exchanger 212 functions as an evaporator. Heat application operation involves heating hot water supply warm water through heat exchange between the hot water supply warm water and the refrigerant flowing into the hot water supply heat exchanger 216 from the discharge side of the compressor 211.

The warm water circuit 248 has circulation of warm water subject to heat exchange with the refrigerant flowing in the hot water supply heat exchanger 216. Specifically, during heat application operation, the hot water supply heat exchanger 216 is supplied with hot water supply warm water discharged from the hot water supply tank 25 by the pump 217, and warm water heated in the hot water supply heat exchanger 216 is returned into the hot water supply tank 25.

The gas hot water supplier 26 connected to the hot water supply tank 25 via the water pipe 246 includes a heater 26a and is connected to the hot water supply terminal 210. The gas hot water supplier 26 can thus heat the hot water supply warm water supplied from the hot water supply tank 25 and not yet supplied to the hot water supply terminal 210. The hot water supply terminal 210 allows a user to use warm water in the hot water supply tank 25.

During heat application operation, the control unit 220 adjusts, in accordance with measurement values and the like of various sensors including the outputted hot water temperature sensor 222, the compressor 211, the number of revolutions of the fan motor 215a1 of the fan 215a, and an opening degree of the expansion valve 213 to a predetermined opening degree. The control unit 220 is connected to various sensors and control targets (the compressor 211, the fan motor 215a1, and the expansion valve 213) via signal lines, though the signal lines are not depicted in FIG. 6 for convenience.

(4) Control of Fan Motor

Similarly to the control unit 123 of the air conditioner 1, the control unit 220 of the hot water supplier 2 executes at least one of the first control and the second control. Contents of such control are basically similar to contents of the control executed by the control unit 123, and will thus not be detailed again. The control unit 220 executes heat application operation as described above. In the control flow of each of the first control and the second control depicted in FIG. 4 and FIG. 5, "cooling or heating operation" will thus be replaced with "heat application operation".

(5) Characteristics (5-1)

The hot water supplier 2 includes the fan device 215. The hot water supplier 2 can thus suppress electric power consumption of the fan motor 215a1 as well as inhibit poor oil film formation in the bearing of the fan motor 215a1.

Third Embodiment (1) Entire Configuration

Figure 7:
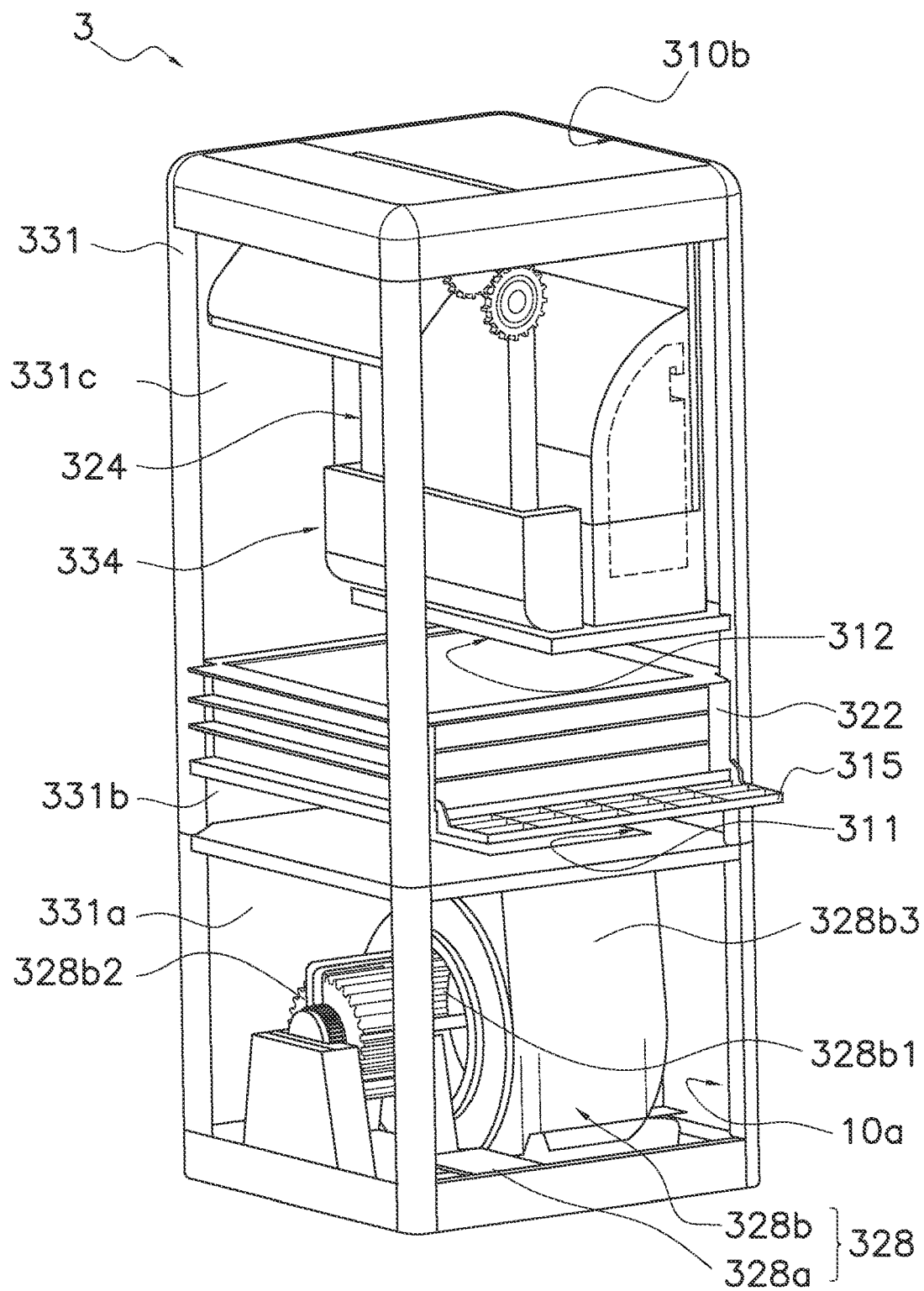
FIG. 7 is a perspective view from diagonally ahead, of an air cleaner 3.
Figure 8:
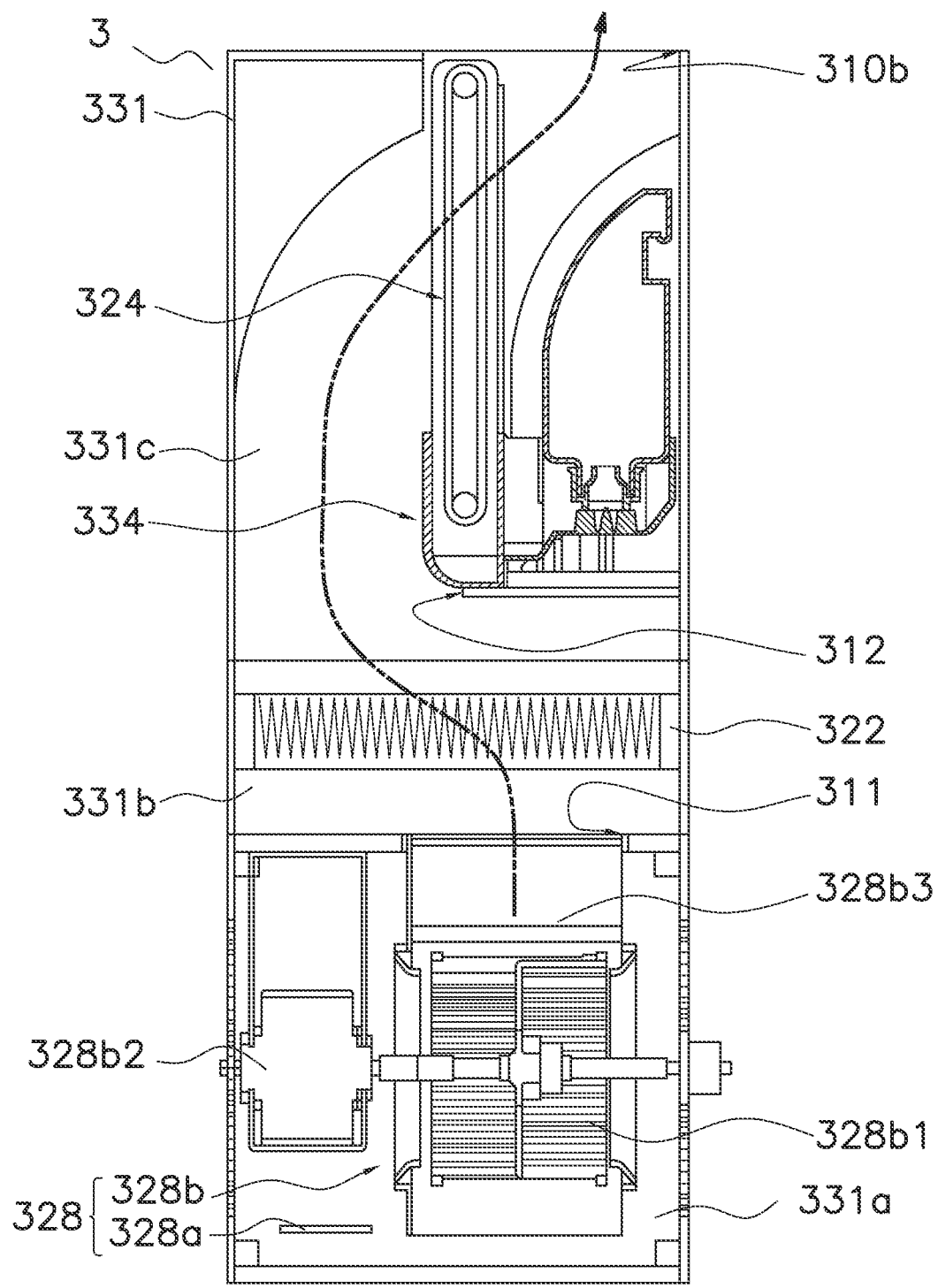
FIG. 8 is a sectional view of the air cleaner 3.

The fan device according to the present disclosure may be applied to an air cleaner. Described below with reference to the drawings is an air cleaner 3 including a fan device 328 exemplifying the fan device according to the present disclosure. FIG. 7 is a perspective view from diagonally ahead, of the air cleaner 3. FIG. 8 is a sectional view of the air cleaner 3. FIG. 7 depicts such that four vertical side surfaces are removed to visualize an internal structure. The air cleaner 3 includes a casing 331, the fan device 328, an air cleaning filter 322, and a humidifying element 324.

(2) Detailed Configurations (2-1) Casing

The casing 331 has an interior divided into a blast chamber 331a, an air cleaning chamber 331b, and a humidifying chamber 331c. The blast chamber 331a, the air cleaning chamber 331b, and the humidifying chamber 331c are aligned in the mentioned order from bottom to top. The blast chamber 331a accommodates the fan device 328. The air cleaning chamber 331b accommodates the air cleaning filter 322. The humidifying chamber 331c accommodates the humidifying element 324. The blast chamber 331a and the air cleaning chamber 331b interpose a first opening 311. The first opening 311 allows air to flow from the blast chamber 331a to the air cleaning chamber 331b. The air cleaning chamber 331b and the humidifying chamber 331c interpose a second opening 312. The second opening 312 allows air to flow from the air cleaning chamber 331b to the humidifying chamber 331c.

(2-2) Fan Device

The fan device 328 includes a control unit 328a and a fan 328b. The fan 328b principally includes a fan rotor 328b1, a fan motor 328b2, and a scroll 328b3. The fan rotor 328b1 is a sirocco fan rotation-driven by the fan motor 328b2. Similarly to the fan motor 134, the fan motor 328b2 includes a bearing (not depicted) supporting a shaft. Similarly to the bearings 134d, the bearing of the fan motor 328b2 is of a hermetically sealed type filled therein with lubricant such as grease. The scroll 328b3 forms an air duct guiding air blown out of the fan rotor 328b1 to the first opening 311 positioned above the fan rotor 328b1. The air blown out of the fan rotor 328b1 passes the scroll 328b3 and the first opening 311, and enters the air cleaning chamber 331b.

(2-3) Air Cleaning Filter

The air cleaning filter 322 removes dust and components of uncomfortable smells in the air. The air cleaning filter 322 includes a plurality of filters having different functions.

(2-4) Humidifying Element

The humidifying element 324 humidifies air passing therethrough. Though not described in detail, the humidifying element 324 sucks water in a tray 334.

(3) Behavior of Air Cleaner

When the air cleaner 3 is powered on, the control unit 328a executes air cleaning operation. During air cleaning operation, the control unit 328a drives the fan motor 328b2 to rotate the fan rotor 328b1 in the fan device 328. There is accordingly generated an airflow from a suction port (not depicted) provided in a side surface of the casing 331 toward the fan rotor 328b1. Air flowing into the fan rotor 328b1 is blown out in radial direction and passes the scroll 328b3 and the first opening 311 to enter the air cleaning chamber 331b. Dust and smells are removed from air passing the air cleaning filter 322. The air having passed the air cleaning filter 322 passes the second opening 312 and enters the humidifying chamber 331c. The air moved from the air cleaning chamber 331b into the humidifying chamber 331c promotes vaporization of water sucked into the humidifying element 324 to become humidified air. The humidified air is blown out of a blow-out port 310b provided at the top of the casing 331.

During air cleaning operation, the control unit 328a adjusts the number of revolutions of the fan motor 328b2 in accordance with measurement values and the like of a temperature sensor and a humidity sensor (not depicted).

(4) Control of Fan Motor

Similarly to the control unit 123 of the air conditioner 1, the control unit 328a of the air cleaner 3 executes at least one of the first control and the second control. Contents of such control are basically similar to contents of the control executed by the control unit 123, and will thus not be detailed again. The control unit 328a executes air cleaning operation as described above. In the control flow of each of the first control and the second control depicted in FIG. 4 and FIG. 5, "cooling or heating operation" will thus be replaced with "air cleaning operation".

(5) Characteristics (5-1)

The air cleaner 3 includes the fan device 328. The air cleaner 3 can thus suppress electric power consumption of the fan motor 328b2 as well as inhibit poor oil film formation in the bearing of the fan motor 328b2.

The embodiments of the present disclosure have been described above. Various modifications to modes and details should be available without departing from the object and the scope of the present disclosure recited in the claims.

The invention claimed is:

1. A fan device comprising:
   a motor having a variable number of revolutions, the motor including a shaft supported by a hermetically sealed bearing enclosing lubricant; and
   an electronic controller configured to drive the motor, the electronic controller being configured to execute, when continuously driving the motor at a first number of revolutions or less for a first time period, driving the motor at a second number of revolutions more than the first number of revolutions for a second time period shorter than the first time period,
   the first number of revolutions causing poor oil film formation of the lubricant in the bearing if the motor is driven for more than the first time period, and the second number of revolutions causing oil film formation of the lubricant in the bearing if the motor is driven for the second time period.

2. The fan device according to claim 1, wherein the first number of revolution is 50 rpm or more and less than 300 rpm.

3. The fan device according to claim 2, wherein the second number of revolution is 300 rpm or more.

4. The fan device according to claim 3, wherein the first time period is ten minutes or more and five hours or less.

5. The fan device according to claim 4, wherein the second time period is one second or more and two minutes or less.

6. The fan device according to claim 2, wherein the first time period is ten minutes or more and five hours or less.

7. The fan device according to claim 2, wherein the second time period is one second or more and two minutes or less.

8. The fan device according to claim 1, wherein the second number of revolution is 300 rpm or more.

9. The fan device according to claim 8, wherein the first time period is ten minutes or more and five hours or less.

10. The fan device according to claim 8, wherein the second time period is one second or more and two minutes or less.

11. The fan device according to claim 1, wherein the first time period is ten minutes or more and five hours or less.

12. The fan device according to claim 11, wherein the second time period is one second or more and two minutes or less.

13. The fan device according to claim 1, wherein the second time period is one second or more and two minutes or less.

14. A utilization unit of an air conditioner including the fan device according to claim 1.

15. A heat source unit of an air conditioner including the fan device according to claim 1.

16. A hot water supplier including the fan device according to claim 1.

17. An air cleaner including the fan device according to claim 1.

* * * * *